(12) United States Patent
Koo

(10) Patent No.: US 10,291,712 B2
(45) Date of Patent: May 14, 2019

(54) SHARING CONTROL RIGHT OF M2M DEVICE

(71) Applicant: KT CORPORATION, Gyeonggi-do (KR)

(72) Inventor: Bum-Mo Koo, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 110 days.

(21) Appl. No.: 14/190,800

(22) Filed: Feb. 26, 2014

(65) Prior Publication Data

US 2014/0242940 A1 Aug. 28, 2014

(30) Foreign Application Priority Data

Feb. 26, 2013 (KR) .................. 10-2013-0020508

(51) Int. Cl.
| | | |
|---|---|---|
| *H04W 4/70* | (2018.01) | |
| *H04L 29/08* | (2006.01) | |
| *H04W 12/04* | (2009.01) | |
| *H04W 12/06* | (2009.01) | |
| *H04W 80/10* | (2009.01) | |

(52) U.S. Cl.
CPC ............ *H04L 67/125* (2013.01); *H04W 4/70* (2018.02); *H04W 12/06* (2013.01); *H04W 12/04* (2013.01); *H04W 80/10* (2013.01)

(58) Field of Classification Search
CPC ..... H04W 4/005; H04W 12/04; H04W 12/06; H04W 12/08; H04W 28/0215; H04W 48/08; H04W 72/00; H04W 72/02; H04W 72/04; H04W 72/042; H04W 72/0406; H04W 80/10; H04L 63/068; H04L 67/12
See application file for complete search history.

(56) References Cited

U.S. PATENT DOCUMENTS

| | | | | |
|---|---|---|---|---|
| 5,377,267 A | * | 12/1994 | Suzuki | ............... H04L 9/3271 340/5.74 |
| 6,009,461 A | | 12/1999 | Yamano | |
| 6,553,099 B1 | | 4/2003 | Gundlach | |
| 6,970,183 B1 | | 11/2005 | Monroe | |
| 7,363,003 B2 | * | 4/2008 | Takatani | ............... H04B 7/2606 455/11.1 |

(Continued)

FOREIGN PATENT DOCUMENTS

| | | |
|---|---|---|
| JP | 2003-116181 A | 4/2003 |
| JP | 2005-135245 A | 5/2005 |

(Continued)

*Primary Examiner* — Michael A Keller
*Assistant Examiner* — Austin J Moreau
(74) *Attorney, Agent, or Firm* — IP Legal Services, LLC

(57) ABSTRACT

The disclosure is related to a method of allowing user terminals to share a control right of a machine to a machine (M2M) device by a M2M service server. The method may include receiving a sharing request message from a first user terminal registered at the M2M service server to share predetermined control rights of a M2M device with a second user terminal, creating a virtual resource for the second user terminal based on information included in the sharing request message, and allowing the second user terminal to control predetermined features of the M2M device based on the created virtual resource in response to a control request message from the second user terminal.

11 Claims, 10 Drawing Sheets

(56) References Cited

U.S. PATENT DOCUMENTS

| | | |
|---|---|---|
| 8,676,195 B2 | 3/2014 | Zhang et al. |
| 2002/0175819 A1 | 11/2002 | Joo |
| 2003/0037170 A1 | 2/2003 | Zeller et al. |
| 2004/0125789 A1 | 7/2004 | Parker et al. |
| 2005/0021785 A1 | 1/2005 | Nakaji |
| 2006/0066900 A1 | 3/2006 | Abe et al. |
| 2006/0172766 A1 | 8/2006 | Kim et al. |
| 2006/0173708 A1 | 8/2006 | Vining et al. |
| 2007/0058789 A1 | 3/2007 | Lim et al. |
| 2007/0071436 A1* | 3/2007 | Mayuzumi ............ G03B 17/24 396/310 |
| 2007/0153993 A1 | 7/2007 | Cohen |
| 2007/0224997 A1 | 9/2007 | Florkey et al. |
| 2007/0273499 A1 | 11/2007 | Chlubek et al. |
| 2009/0060514 A1 | 3/2009 | DiChiro et al. |
| 2009/0217364 A1 | 8/2009 | Salmela et al. |
| 2010/0002582 A1 | 1/2010 | Luft et al. |
| 2010/0011063 A1 | 1/2010 | Blaiotta et al. |
| 2010/0127850 A1 | 5/2010 | Poder |
| 2010/0138484 A1 | 6/2010 | Lee et al. |
| 2010/0146117 A1 | 6/2010 | Hoeksel |
| 2010/0177663 A1 | 7/2010 | Johansson et al. |
| 2010/0318913 A1 | 12/2010 | Cupala et al. |
| 2011/0090334 A1 | 4/2011 | Hicks, III et al. |
| 2011/0235520 A1 | 9/2011 | Maciej et al. |
| 2011/0264914 A1* | 10/2011 | Bae ..................... H04L 63/06 713/170 |
| 2011/0265158 A1 | 10/2011 | Cha et al. |
| 2011/0321147 A1* | 12/2011 | Chakra ............ G06F 21/6218 726/9 |
| 2012/0004003 A1 | 1/2012 | Shaheen et al. |
| 2012/0124228 A1 | 5/2012 | Yu et al. |
| 2012/0131338 A1 | 5/2012 | Bellwood et al. |
| 2012/0203905 A1 | 8/2012 | Lee et al. |
| 2012/0207113 A1 | 8/2012 | Yoon et al. |
| 2013/0094494 A1 | 4/2013 | Lim et al. |
| 2013/0142118 A1* | 6/2013 | Cherian ................. H04L 45/00 370/328 |
| 2013/0212236 A1 | 8/2013 | Foti et al. |
| 2013/0246519 A1 | 9/2013 | Foti |
| 2013/0295983 A1 | 11/2013 | Kim et al. |
| 2013/0332554 A1 | 12/2013 | Lee et al. |
| 2014/0006612 A1 | 1/2014 | Fallon et al. |
| 2014/0006629 A1* | 1/2014 | Lau ..................... H04L 65/1033 709/227 |
| 2014/0038549 A1 | 2/2014 | Lehane et al. |
| 2014/0220951 A1* | 8/2014 | Gumbrell ............ H04W 4/005 455/418 |
| 2014/0244834 A1* | 8/2014 | Guedalia ............... H04L 67/16 709/224 |
| 2014/0256285 A1 | 9/2014 | Koo |
| 2015/0055557 A1 | 2/2015 | Dong et al. |
| 2015/0245161 A1* | 8/2015 | Pareglio ................ H04W 4/005 455/435.1 |

FOREIGN PATENT DOCUMENTS

| | | |
|---|---|---|
| JP | 2009-239727 A | 10/2009 |
| KR | 10-2006-0089030 A | 8/2006 |
| KR | 10-2006-0096602 A | 9/2006 |
| KR | 10-0673165 B1 | 1/2007 |
| KR | 10-2008-0024481 A | 3/2008 |
| KR | 10-2008-0050044 A | 6/2008 |
| KR | 10-2009-0051933 A | 5/2009 |
| KR | 10-0909542 B1 | 7/2009 |
| KR | 10-2010-0029383 A | 3/2010 |
| KR | 10-2010-0061406 A | 6/2010 |
| KR | 10-2011-0133709 A | 12/2011 |
| KR | 10-2012-0050738 A | 5/2012 |
| KR | 10-2012-0056401 A | 6/2012 |
| KR | 10-2012-0093559 A | 8/2012 |
| KR | 10-2012-0098899 A | 9/2012 |

\* cited by examiner

SHARING CONTROL RIGHT OF M2M DEVICE

CROSS REFERENCE TO PRIOR APPLICATIONS

The present application claims priority under 35 U.S.C. § 119 to Korean Patent Application No. 10-2013-0020508 (filed on Feb. 26, 2013), which is hereby incorporated by reference in its entirety.

The subject matter of this application is related to U.S. patent application Ser. No. 13/966,615 filed Aug. 14, 2013, and U.S. patent application Ser. No. 14/196,906 filed Mar. 4, 2014, the teachings of which are incorporated herein their entirety by reference.

BACKGROUND

The present disclosure relates to sharing a control right of a machine to machine (M2M) device through a virtual service capabilities layer (SCL) and, more particularly, to sharing a control right of a M2M device with a user terminal registered in a different communication service network.

Machine to machine (M2M) communication has enabled many convenient features and services. One of the convenient features and services provided through M2M communication is a remote controlling system. A typical remote controlling system remotely monitors a target area and controls one of a M2M device based on the monitoring results using M2M communication technology.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a control right of a M2M device for one user terminal may be shared with other user terminals.

In accordance with another aspect of the present invention, a control right of a M2M device may be shared among user terminals by creating a virtual service capability layer.

In accordance with still another aspect of the present invention, an unregistered user terminal may be allowed to control a M2M device by creating a virtual service capability layer.

In accordance with yet another aspect of the present invention, a control right of each feature of a M2M device may be shared differently with user terminals through creating a virtual service capability layer.

In accordance with at least one embodiment, a method may be provided for allowing user terminals to share a control right of a machine to a machine (M2M) device by a M2M service server. The method may include receiving a sharing request message from a first user terminal registered at the M2M service server to share predetermined control rights of a M2M device with a second user terminal, creating a virtual service capability layer (SCL) for the second user terminal based on information included in the sharing request message, and allowing the second user terminal to control predetermined features of the M2M device based on the created virtual SCL in response to a control request message from the second user terminal.

The sharing request message may include information on the second user terminal, information on the M2M device to control, information on the predetermined control rights of the M2M device, and information on a sharing time period.

The virtual SCL may include a first element containing information on the second user terminal, a second element containing information on controllable features of the M2M devices each matched with the predetermined control rights, respectively, a third element containing information on a uniform resource identifier (URI) of the second user terminal, and a fourth element containing information on a sharing time period.

The method may further include determining whether the second user terminal is a subscriber of the first M2M service server and temporary registering the second user terminal when the second user terminal is not a subscriber of the first M2M service server. The temporary registering may include transmitting a temporal registration request message to the second user terminal through a first IP multimedia subsystem (IMS) platform of the first user terminal and a second IMS platform of the second user terminal and performing the temporary registering upon receipt of a registration request message from the second user terminal. The temporal registration message may be an session initiation protocol (SIP) message that includes at least one of information on an address of the second M2M service platform, a temporary ID of the second user terminal, and an encryption key for sharing the control right. The transmitting a temporal registration request message may include determining domain information on a second communication network of the second user terminal from an ENUM server and transmitting the temporal registration request message to the second user terminal using the determined domain information of the second communication network. The temporary registering the second user terminal may include generating an encryption key for sharing the control right with the second user terminal, creating a temporal registration request message including the generated encryption key, transmitting the temporal registration request message to the second user terminal and performing an authentication process upon receipt of a registration request message from the second user terminal. The performing an authentication process may include comparing the generated encryption key with an encryption key included in the registration request message from the second user terminal.

The allowing the second user terminal to control predetermined features of the M2M device may include receiving a control request message from the second user terminal, determining target features of a M2M device to control based on information in the control request message, determining whether the second user terminal has control rights matched with the target features of the M2M device based on the virtual SCL associated with the second user terminal, and allowing the second user terminal to control the target features of the M2M device when the second user terminal has the control rights matched with the target features of the M2M device based on the associated virtual SCL.

The method may further include determining whether the control request message is received before a sharing period time associated with the second user terminal expires. The method may further include charging the first user terminal for data exchanged with the second user terminal and the M2M device.

In accordance with at least one embodiment, a server may be provided for allowing user terminals to share a control right of a machine to a machine (M2M) device. The server may be configured to receive a sharing request message from a first user terminal registered at the server to share predetermined control rights of a M2M device with a second user terminal, to create a virtual service capability layer (SCL) for the second user terminal based on information included in the sharing request message, and to allow the second user terminal to control predetermined features of the M2M device based on the created virtual SCL in response to a control request message from the second user terminal.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
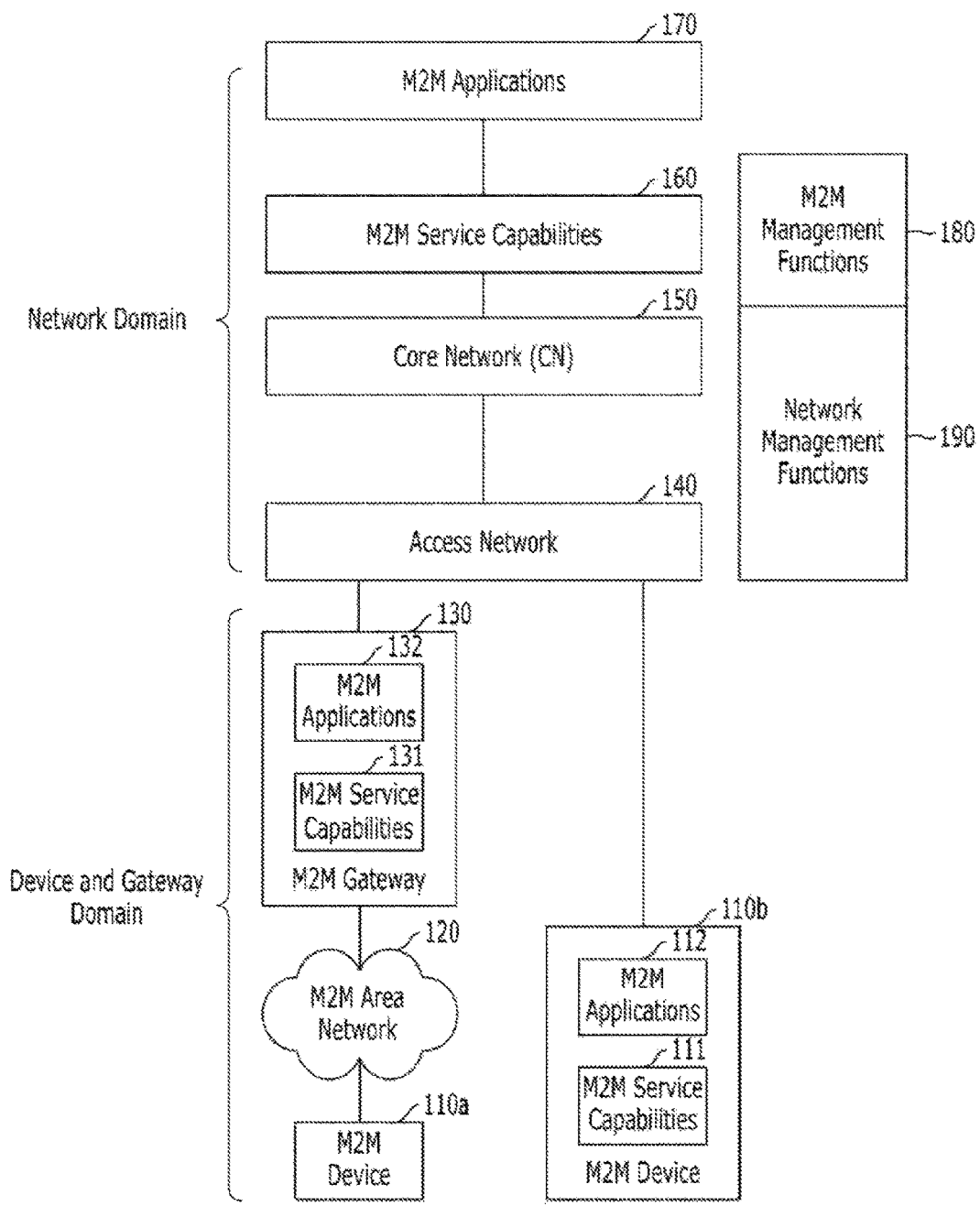
FIG. 1 illustrates a typical architecture for M2M services according to the ETSI standard.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a control right of a M2M device may be shared with multiple user terminals through creating a virtual resource. Such a created virtual resource may enable a user terminal to share a control right of a M2M device with user terminals not registered at the same M2M service platform. Furthermore, the created virtual resource may allow sharing a control right of each feature of a M2M device differently with user terminals. For convenience and ease of understanding, the virtual resource will be described as a virtual service capability layer (SCL), but the present invention is not limited thereto. Such a virtual resource may be referred to as a virtual common service entity (CSE). Hereinafter, an architecture for providing M2M services will be described with reference to FIG. 1

FIG. 1 illustrates a typical architecture for M2M services according to the ETSI standard.

Referring to FIG. 1, M2M devices 110a and 110b are terminals that perform communication without human intervention or in a state in which human intervention is minimized. In particular, M2M devices 110a and 110b may refer to any type of devices that send and forward data stored therein, in response to an external request or automatically.

According to the ETSI standard, in the case that M2M device 110b directly connects to access network 140, M2M device 110b may run M2M applications 112 using M2M service capabilities (SCs) 111. Herein, the M2M applications 112 may be referred to as "device applications (DAs)." Meanwhile, M2M device 110a may connect to access network 140 via M2M gateway 130. In this case, M2M device 110a may use M2M service capabilities (SCs) 131 of M2M gateway 130.

M2M area network 120 may provide connectivity between M2M device 110a and M2M gateway 130. For example, M2M area network 120 may include a personal area network (PAN) and/or a local area network (LAN), but is not limited thereto. The PAN may include IEEE 802.15.x, Zigbee, Bluetooth, IETF ROLL, ISA100.11a, and so forth. The LAN may include PLC, M-BUS, Wireless M-BSU, KNX, and so forth.

M2M gateway 130 may run M2M applications 132 using M2M service capabilities (SCs) 131. Herein, M2M applications 132 may be referred to as "gateway applications (GAs). M2M gateway 130 may act as a proxy between M2M device 110a and access network 140.

Access network 140 may allow M2M device 110b and/or M2M gateway 130 to communicate with core network (CN) 150. For example, access network 140 may include an xDSL network, a hybrid fiber coaxial (HFC) network, a FTTH network, a PLC network, a satellite network, GERAN, UTRAN, eUTRAN, Wireless LAN, and/or a WiMAX (WiBro) network, but is not limited thereto.

Core network (CN) 150 may provide IP connectivity, an access network control, network/service control functions, an interconnection with other networks, roaming functions, and so forth. For example, core network 150 may include 3GPP CN, ETSI TISPAN CN, 3GPP2 CN, and/or IP multimedia subsystem (IMS), but is not limited thereto.

M2M service capabilities (SCs) 160 in a network domain may provide functions that are to be shared by different applications, and environments that allow access to other service capabilities through open interfaces. The use of such M2M service capabilities may make it possible to develop and deploy optimized applications without considering characteristics of lower network layers.

M2M applications 170 of the network domain may run M2M service logic and use M2M service capabilities through an open interface provided in the M2M system. Herein, M2M applications 170 may be referred to as "network applications (NAs)."

Referring to FIG. 1, the network domain may include M2M management functions 180 and network management functions 190. M2M management functions 180 may include all the functions required to manage M2M service capabilities 160 in the network domain. The management of the M2M devices (e.g., 110a, 110b) and the M2M gateways (e.g., 130) may use a specific M2M service capability. Network management functions 190 may include all the functions required to manage access network 140 and core network 150. Network management functions 190 may include a variety of functions such as a provisioning, supervision, fault management, and so forth.

According to the ETSI standard, M2M service capabilities 160 in the network domain may be referred to as a network service capabilities layer (NSCL). M2M service capabilities 131 in M2M gateway 130 may be referred to as a gateway service capabilities layer (GSCL). M2M service capabilities (e.g., 111) in M2M devices (e.g., 110a, 110b) may be referred to as a device service capabilities layer (DSCL). NSCL 160, GSCL 131, and DSCL 111 may be collectively referred to as a service capabilities layer (SCL). NSCL 160 may refer to individual platforms established for services by M2M service providers. Herein, NSCL 160 may be a platform which is individually implemented per each service by an M2M service provider. In the present embodiment, a specific server providing a specific service may correspond to NSCL 160.

A M2M service is provided through a M2M service platform (e.g., a M2M server) which may be established within a predetermined communication service network. In general, the M2M service platform and the predetermined communication service network are established by the same communication service provider, such as Verizon or AT&T. Accordingly, a M2M service of one service provider cannot be provided to a user terminal registered at a different service provider, typically. That is, when a user terminal is a subscriber of one communication service provider or of one M2M service provider, such a user terminal cannot be participated in a M2M service provided by another M2M service provider or through a communication service network of another communication service provider. In accordance with at least one embodiment, a M2M service system provides a M2M service not only to a user terminal registered in the same service platform but also to a user terminal registered in a different service platform by sharing a control right of a target M2M device through creating a virtual SCL. Furthermore, a virtual SCL in accordance with at least one embodiment may allow sharing a control right of each feature of a M2M device differently with user terminals.

For convenience and ease of understanding, an unregistered user terminal is referred to as a user terminal not registered at the same M2M service server of a registered user terminal or at the same communication service network of a registered user terminal. Such an unregistered user terminal may be registered at a M2M service server or a communication service network provided by a service provider different from that of a registered user terminal. Hereinafter, a M2M service system for providing a M2M service to an unregistered user terminal will be described with reference to FIG. 2.

Figure 2:
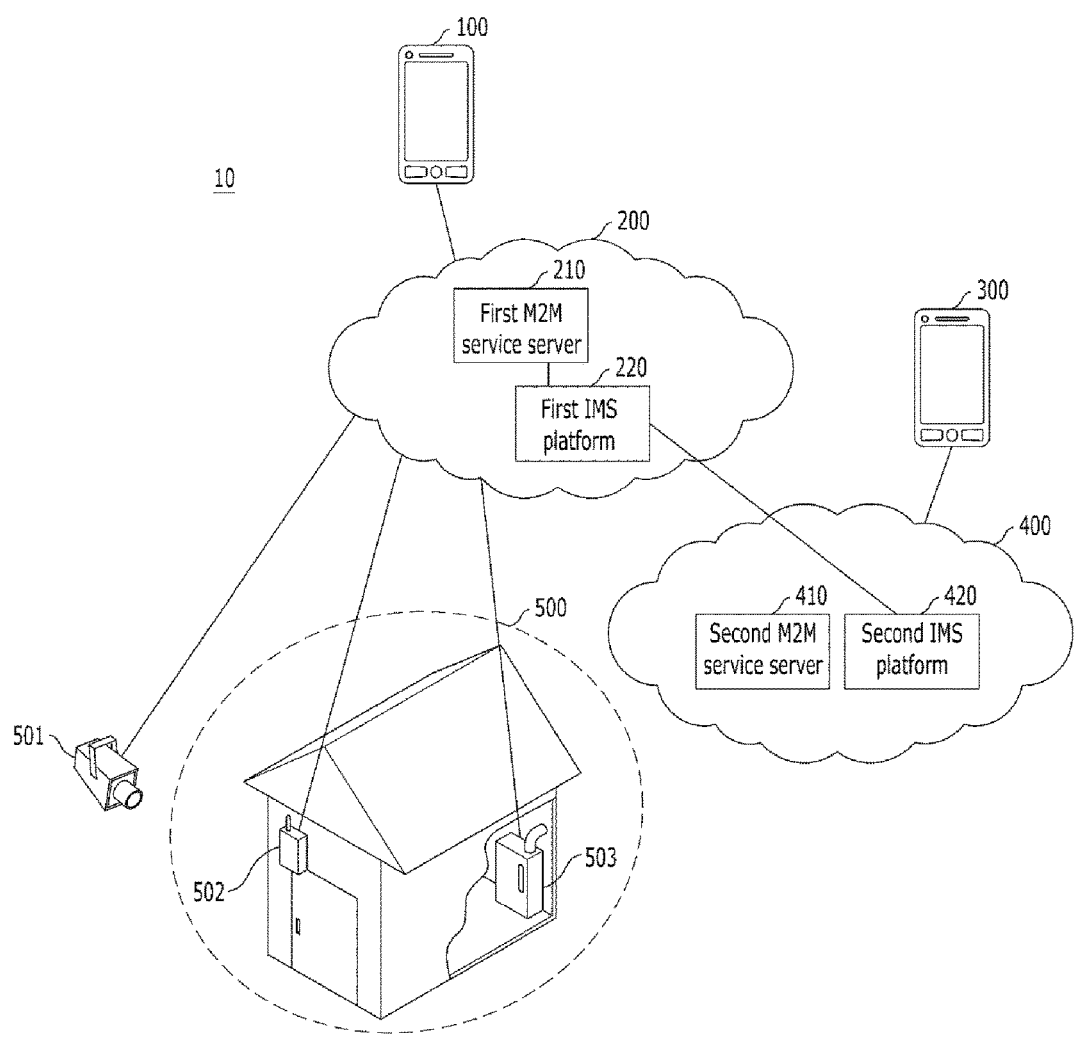
FIG. 2 illustrates a M2M service system for sharing a control right of a M2M device with user terminals in accordance with an exemplary embodiment.

FIG. 2 illustrates a M2M service system for sharing a control right of a M2M device with user terminals in accordance with an exemplary embodiment.

Referring to FIG. 2, M2M service system 10 may include first user terminal (e.g., registered user terminal) 100, first M2M service server 210, first IP multimedia subsystem (IMS) platform 220, third user terminal (e.g., unregistered user terminal) 300, second M2M service server 410, second IMS platform 420, and a plurality of M2M devices 501 to 503. First M2M service server 210 and first IMS platform 220 belong to first communication service network 200 and second M2M service server 410 and second IMS platform 220 belong to second communication service network 400. That is, first M2M service server 210 and first IMS platform 220 may be established by a communication service provider of first communication service network 200. Second M2M service server 410 and second IMS platform 420 may be established by a communication service provider of second communication service network 400, which is different from that of first communication service network 400.

First user terminal 100 is provided with a desired M2M service from first M2M service server 210 in corporation with first IMS platform 220 through first communication service network 200. For example, first user terminal 100 is a user terminal of a subscriber who subscribes a M2M service of M2M service server 210. First user terminal 100 may be referred to as a registered user terminal. That is, registered user terminal 100 may control M2M devices 501 to 503 through M2M service server 210 and IMS platform 220. Such registered user terminal 100 is coupled to M2M service server 210 through first communication service network 200.

M2M devices 501 to 503, first user terminal 100, third user terminal 300, and M2M service server 210 may have an associated network application or a M2M application in order to cooperate with each other based on a M2M protocol. In addition, M2M devices 501 to 503, first user terminal 100, third user terminal 300, and server 210 may commonly employ a service capability layer (SCL) for general control of M2M communication and for storing and managing information for authentication and communication among other parties in M2M communication.

M2M devices 501 to 503 may be deployed at around target area 500. Such M2M devices 501 to 503 may sense activities and incidents occurring in target area 500 and provide such sensing results to M2M service server 210 as context information on target area 500. Target area 500 may be various places to be monitored. For example, target area 500 may be home, an office unit, or an entire building. M2M devices 501 to 503 may be any devices capable of sensing activities and incidents occurring at target area 500 and communicating with other parties including M2M service server 210 and neighbor devices. For example, M2M devices 501 to 503 may include a closed-circuit television (CCTV), a security camera, a motion sensor, a temperature controller, a light controller, a fire detector, a gas detector, a temperature sensor, a humidity sensor, a pressure sensor, a gyro sensor, a velocity sensor, and so forth.

Such M2M devices 501 to 503 may be used for sensing various activities such as intrusion, illegal entry, fire, abnormal temperature or humidity, flood, and so forth. Also, M2M devices 510 to 503 may be used for controlling devices in target area 500. In order to sense such activities, devices 110 may collect context information of target area 100. For example, a security camera (e.g., M2M device 501) captures images of activities in target area 500 or a temperature sensor (e.g., M2M device 502) senses temperature in target area 500. After collecting such context information, M2M devices 501 and 502 transmits the collected context information to M2M service server 210 through communication network 200.

First M2M service server 210 may be coupled to M2M devices 501 to 503 through first communication service network 200 and receive context information of target area 500 from M2M devices 501 to 503. M2M service server 210 may be a M2M network service capability layer (NSCL), but the present invention is not limited thereto. First M2M service server 210 may manage and process the context information and stores the context information such as a time of collecting the context information, an associated device, an associated subscriber, and so forth. In accordance with at least one embodiment, first M2M service server 210 may provide a desired M2M service not only to registered user terminal 100 of a subscriber of first communication service network 200 but also to unregistered user terminal 300 of a subscriber of second communication service network 400 by creating a virtual SCL for sharing predetermined control rights of M2M devices 501 to 503.

First user terminal 100 may be registered at first M2M service server 210 and used for controlling M2M devices 501 to 503 in connection with first M2M service server 210. Furthermore, first user terminal 100 may be registered at first communication service network 200. First user terminals 100 may be devices capable of communication through various types of networks and interaction with first IMS platform 220.

Furthermore, first user terminal 100 may be required to have a predetermined application program such as a network application or a M2M application for the desired M2M service. Particularly, a predetermined service application may be downloaded from first M2M service server 210 and installed at first user terminal 100 for the M2M service in accordance with at least one embodiment. For example, first user terminal 100 may include a smart phone, a pad-type device, a personal computer (PC), a tablet PC, a laptop PC, personal data assistance (PDA), a personal multimedia player (PMP), and so forth.

In accordance with at least one embodiment, first user terminal 100 allows third user terminal 300 (e.g., unregistered user terminal) to control at least one of M2M devices 501 to 503 by sharing predetermined control rights of M2M devices 501 to 503. Furthermore, first user terminal 100 also allows user terminals registered at the same M2M service platform (e.g., first M2M service server 210) to control at least one of M2M devices 501 to 503 by sharing predetermined control rights of M2M devices 510 to 503.

First IMS platform 220 is a network system for delivering Internet Protocol based multimedia data such as audio data and video data. Through first IMS platform 220, a corresponding communication service provider performs various operations including authentication, authorization, and accounting processes. A communication service provider establishes an own IMS platform and provides various services through the own IMS platform, such as a voice over LTE (VoLTE) service, a packet switch video telephone (PSVT) service, a media CID (MCID), a rich communication-suite (RCS) service, and an intelligent network service. Furthermore, first IMS platform 220 may be used to mutually link a M2M service of first M2M service server 210 with a M2M service of second M2M service server 410 which is established by a different communication service provider.

Third user terminal 300 may be registered at second M2M service server 410 and second IMS platform 420. That is, third user terminal 300 is registered as a subscriber at second communication service network 400. Third user terminal 300 may be devices capable of communication through various types of networks and interaction with second IMS platform 420.

Third user terminal 300 is registered at second communication service network 400 which is established by a communication service provider different from that of first communication service network 200. In view of first user terminal 100, third user terminal 300 is an unregistered user terminal. Accordingly, third user terminal 200 cannot directly have a M2M service provided by first M2M service server 210. In accordance with at least one embodiment, not only a registered user terminal but also an unregistered user terminal (e.g., third user terminal 300) is enabled to be provided with a M2M service of another service provider by creating a virtual SCL. Such operation will be described with reference to FIG. 3 and FIG. 4.

Figure 3:
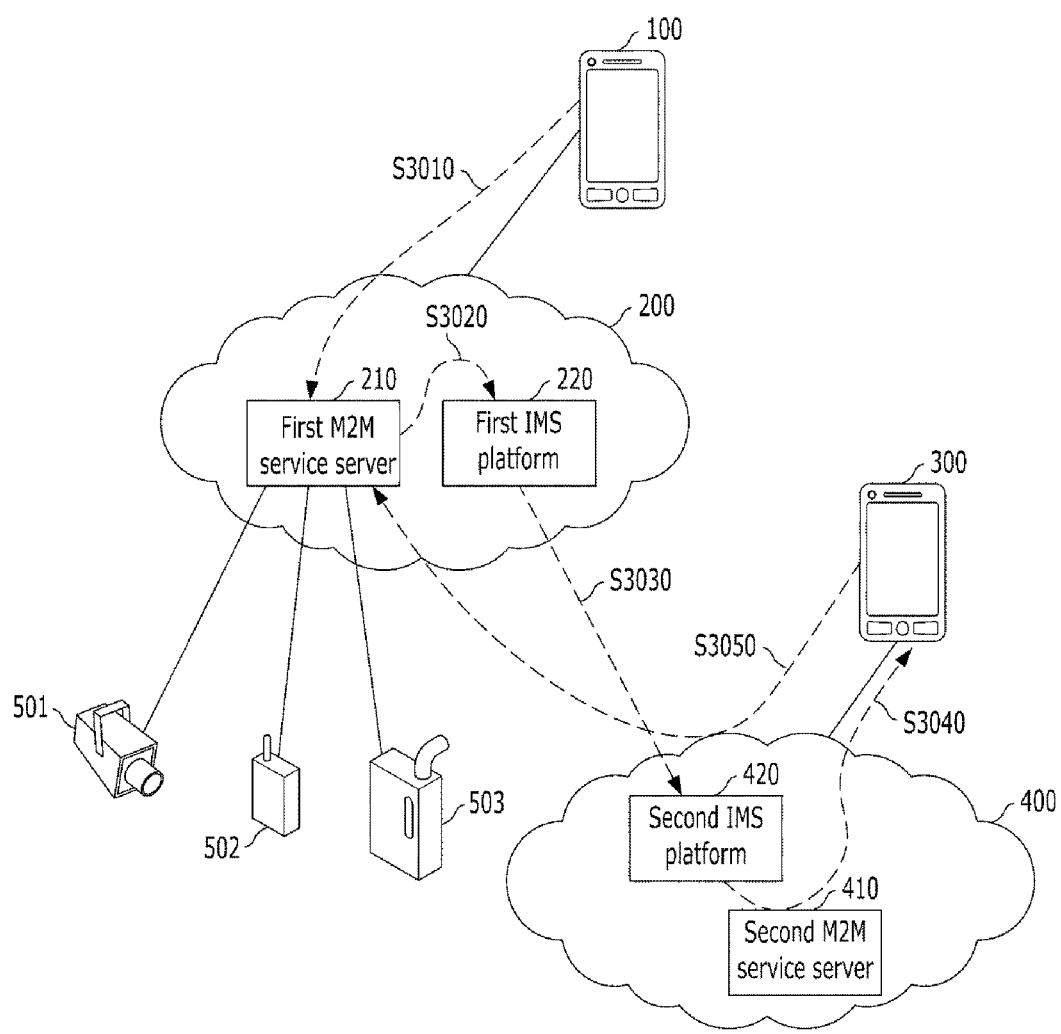
FIG. 3 illustrates temporal registration for an unregistered user terminal and virtual SCL creation for an unregistered user terminal and a registered user terminal in accordance with at least one embodiment.

FIG. 3 illustrates temporal registration for an unregistered user terminal and virtual SCL creation for an unregistered user terminal and a registered user terminal in accordance with at least one embodiment.

At step S3010, first user terminal 100 transmits a request message to first M2M service server 210 to share predetermined control rights of at least one of M2M devices 501 to 503 with third user terminal 300. Such a request message may include information on third user terminal 300, information on a target M2M device to be shared, designated control rights to be shared, and a sharing time period.

At step S3020, first M2M service server 210 determines whether third user terminal 300 is a subscriber of first M2M service server 210 in response to the request message from first user terminal 100. As described, third user terminal 300 is a user terminal not registered at first M2M service server 210. Accordingly, third user terminal 300 is an unregistered user terminal. That is, third user terminal 300 is a subscriber of second communication service network 400 including second M2M service server 410 and second IMS platform 420.

At step S3030, first M2M service server 210 searches for a hosting communication service network of third user terminal 300 based on information included in the request message since third user terminal 300 is an unregistered user terminal. For example, first M2M service server 210 may connect to second IMS platform 420 and obtain necessary information on third user terminal 300 through second IMS platform 420

At step S3040, first M2M service server 210 detects second communication service network 400 as the hosting communication service network and transmits a temporal registration request message to third user terminal 300 through second M2M service server 410.

At step 3050, third user terminal 300 transmits a temporary registration request message to first M2M service server 210. In response to the temporal registration request message, first M2M service server 210 determine whether third user terminal 300 is a user terminal that first user terminal 100 requested to share predetermined control rights of at least one M2M device 501 to 503. First M2M service server 210 temporarily registers third user terminal 300 and transmits a temporal registration confirmation message to third user terminal 300. As registering, first M2M service server 210 may assign a unique identification number (ID) to third user terminal 300.

After the temporal registration, first M2M service server 210 may create a virtual SCL for sharing the designated control rights of at least one of M2M devices 501 to 503. The created virtual SCL may include information on a user terminal allowed to have the designated control rights, information on a target M2M device to share, information on allowed features of the target M2M device to be controlled, and information on a sharing time period. Such a created virtual SCL will be described in more detail with reference to FIG. 5.

When first user terminal 100 requests first M2M service server 210 to share predetermined control rights of at least one of M2M devices 501 to 503 with a second user terminal (not shown) registered at the same M2M service platform (e.g., first M2M service server 210, first M2M service server 210 and the second user terminal do not perform the temporal registration processes (steps S3020 to S3050). In this case, first M2M service server 210 creates a virtual SCL for the second user terminal without performing the temporal registration process.

Figure 4:
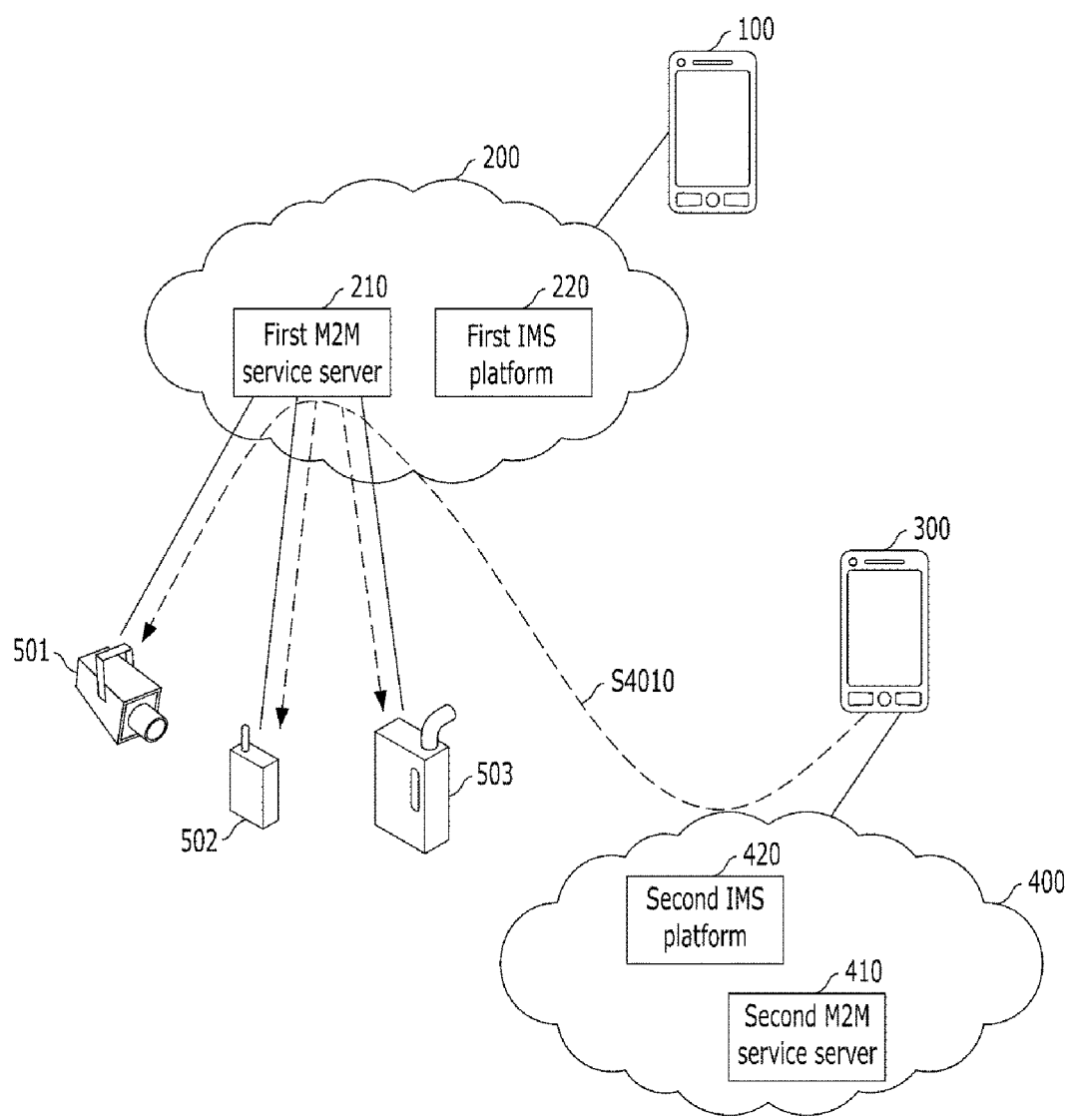
FIG. 4 illustrates controlling a M2M device by a user terminal having a temporal control right in accordance with at least one embodiment.

FIG. 4 illustrates controlling a M2M device by a user terminal having a temporal control right in accordance with at least one embodiment.

For example, first user terminal 100 controls CCTV 501, temperature sensor 502, and boiler 503 through a M2M home monitoring service provided by first M2M service server 220. First user terminal 100 wants to allow third user terminal 300 to control CCTV 501 and boiler 503. Particularly, first user terminal 100 wants to share a part of a control right for CCTV, such as angle control and zooming control of CCTV 510 with third user terminal 300 for ten minutes.

In this case, first M2M service server 210 may temporary register third user terminal 300 as described in FIG. 3 and create a virtual SCL for allowing third user terminal 300 to control predetermined features of CCTV 501 and boiler 503 and assign the created virtual SCL to third user terminal 300. Based on the created virtual SCL, third user terminal 300 can control the angle and the zooming of CCTV 501 through first M2M service server 220 based on the created virtual SCL at step S4010. Hereinafter, such a virtual SCL will be described in more detail with reference to FIG. 5.

Figure 5:
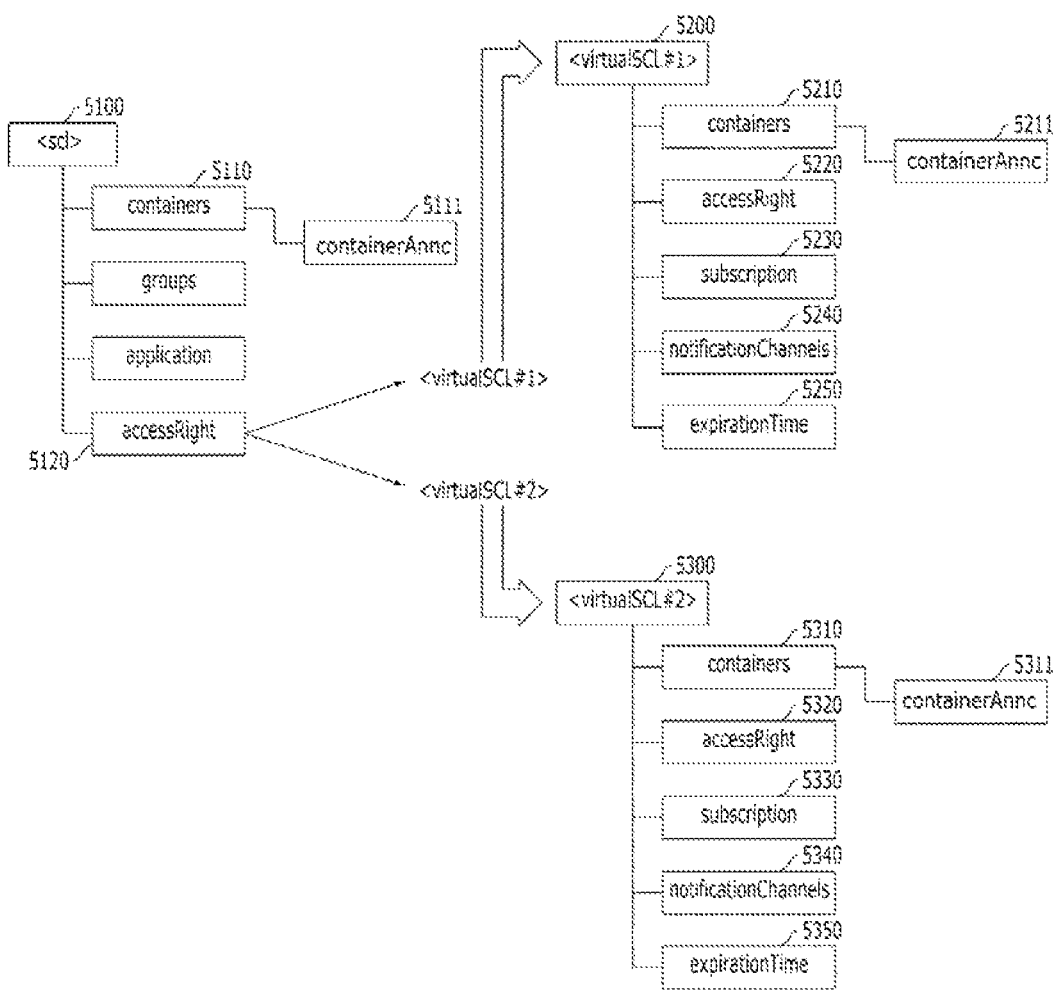
FIG. 5 illustrates a virtual service capabilities layer (SCL) resource created for sharing a control right of a M2M device in accordance with at least one embodiment.

FIG. 5 illustrates a virtual service capabilities layer (SCL) resource created for sharing a control right of a M2M device in accordance with at least one embodiment.

For example, a first user, a second user and a third user may be enabled to mutually share a control right of a M2M device that is provided by a specific M2M service platform in accordance with at least one embodiment. In this example, the first user is a subscriber of a first M2M service platform. The second user is a subscriber of the same first M2M service platform but has no control right of the M2M device. The third user is a subscriber of a second M2M service platform that is provided by a different communication service network. The first to the third users are provided respective M2M services through applications installed in their devices. The devices of the first to the third users will be referred to also as a first user terminal (e.g., registered user terminal 100), a second user terminal, and a third user terminal (e.g., unregistered user terminal 300), respectively. Such a user terminal may include a network application (NA) for M2M services and a session initiation protocol (SIP) client for interacting with a corresponding IMS platform.

For example, the M2M device may be assumed as a closed-circuit television (CCTV). The first user terminal is a subscriber of a M2M service server that provides a M2M service for controlling such a CCTV (e.g., M2M device 501). In this case, the first user terminal may have the following control rights on the CCTV: 1) First control right to turn on and off the CCTV; 2) Second control right to zoom in and out the CCTV; 3) Third control right to turn on and off a light of the CCTV; and 4) Fourth control right to move the CCTV horizontally and vertically.

These control rights of the first user are recorded in <scl> resource 5100 as shown in FIG. 5. For example, the first to fourth control rights 1) to 4) of the first user are recorded in <container> resource 5110.

The first user terminal wants to share predetermined control rights with the second user terminal and the third user terminal. Particularly, the first user wants to give the second user terminal only the second and fourth control rights 2) and 4) for one and half hours and the third user terminal only the fourth control right 4) for ten minutes. In this case, two virtual SCLs may be created. The first user shares the control rights of the CCTV with the second user terminal and the third user terminal through the created virtual SCLs in at least one embodiment. For example, first virtual SCL (virtualSCL#1) 5200 and second virtual SCL (virtualSCL#2) 5300 are created for the second user terminal and the third user terminal, as shown in FIG. 5. <accessRight> resource 5120 records identification information of the second user terminal and the third user terminal, linked to first virtual SCL (virtualSCL#1) 5200 and second virtual SCL (virtualSCL#2) 5300, respectively.

First and second virtual SCLs 2200 and 2300 include multiple resources as shown in FIG. 5. For example, first virtual SCL 2200 may include <containers> resource 5210, <accessRight> 5220, <subscriptions> resource 5230, <notificationChannels> 5240, and <expirationTime> resource 5250. <containers> resource 5210 may record control rights shared with the second user terminal, for example, the first and fourth control rights 2) and 4). <accessRight> 5220 may record identification information of the second user terminal. Furthermore, second virtual SCL 2300 may include <containers> resource 5310, <accessRight> 5320, <subscriptions> resource 5330, <notificationChannels> 5340, and <expirationTime> resource 5350. <containers> resource 5310 may record control rights shared with the third user terminal, for example, the fourth control right 4). <accessRight> 5320 may record identification information of the third user terminal.

Each resource of first and second virtual SCLs 5200 and 5300 may contain information as shown in Table. 1 below.

TABLE 1

| First virtual SCL | | Second virtual SCL | |
| --- | --- | --- | --- |
| Resource | Details | Resource | Details |
| containers 5210 | $2^{nd}$ control right $4^{th}$ control right | container 5310 | $4^{th}$ control right |
| accessRight 5220 | ID of Second user terminal | accessRight 5320 | Temporal ID of third user terminal |
| subscriptions 5230 | URI of second user terminal | subscriptions 5330 | URI of third user terminal |
| Notification channel 5240 | URI of second user terminal | notificationChannels 5340 | URI of third user terminal |
| expirationTime 5250 | One and half hours | expirationTime 5350 | Ten minutes |

All of user terminals registered at a M2M service platform (e.g. M2M service server) are allocated with unique identification numbers (ID). The M2M service platform may be referred to as a network service capability layer (NSCL). Since the second user terminal is registered at the same M2M service platform as the first user terminal, the M2M service platform does not allocate an ID to the second user terminal. However, since the third user terminal is a subscriber of a different M2M service platform, the M2M service platform needs to allocate a temporary ID to the third user terminal.

As described above, a virtual SCL resource is created in order to share a control right of a M2M device. A user allocated with a virtual SCL resource has a control right permitted by the original owner of a target M2M device. The allocated virtual SCL is automatically deleted after a predetermined time period (e.g. expiration time). Multiple virtual SCLs may be generated for single M2M device. Accordingly, it is possible to share a control right of single M2M device by a plurality of users. Furthermore, multiple user terminals may be registered at single virtual SCL. In this case, user terminals may be assigned only with a part of control rights of a M2M device.

Figure 6:
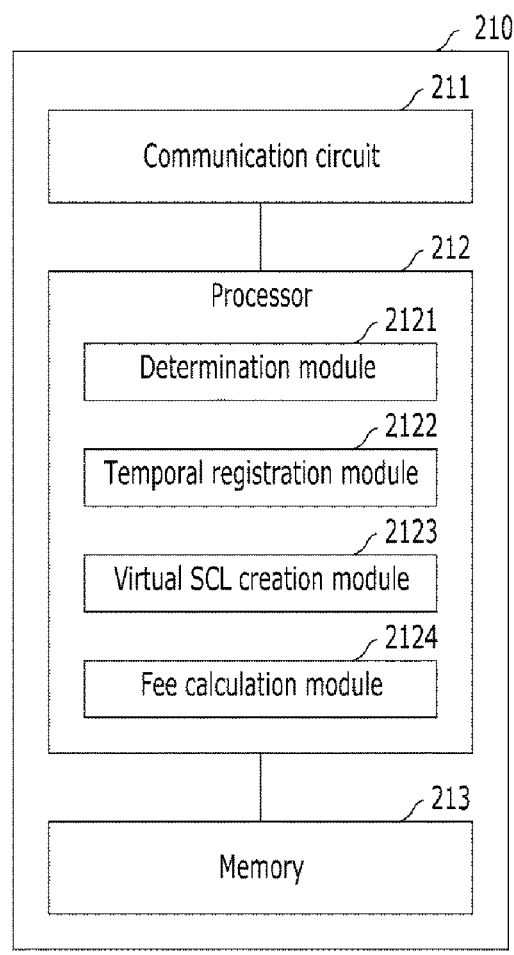
FIG. 6 illustrates a M2M service server for sharing a control right of a M2M device in accordance with at least one embodiment.

FIG. 6 illustrates a M2M service server for sharing a control right of a M2M device in accordance with at least one embodiment.

Referring to FIG. 3, M2M service server 210 may include communication circuit 211, processor 212, and memory 213. Processor 212 may include determination module 2121, temporal registration module 2122, virtual SCL creation module 2123, and fee calculation module 2124.

Communication circuit 211 may establish a communication link to at least one of user terminals 100 and 300, first M2M service server 210, second M2M service server 410, first IMS platform 210, second IMS platform 420, and M2M devices 501 to 503. Through the established link, communication circuit 211 may receive information from or transmit information to at least one of user terminals 100 and 300, first M2M service server 210, second M2M service server 410, first IMS platform 210, and second IMS platform 420 for sharing a control right of at least one of M2M devices 501 to 503. For example, communication circuit 211 perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (Wi-MAX), or a mobile communication network based on CDMA/WCDMA or GSM/GPRS.

Memory 213 may is data storage storing information necessary for driving M2M service server 210 and performing certain operation upon generation of a predetermined event. Such information may include any software programs and related data. Memory 213 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

Processor 212 may control overall operation of the constituent elements of M2M service server 210. In accordance with at least one embodiment, processor 212 may include determination module 2121, temporal registration module 2122, virtual SCL creation module 2123, and fee calculation module 2124. Such modules may be implemented as software module, but the present invention is not limited thereto. Such modules may be implemented as hardware circuits.

Determination module 2121 may determine whether a user terminal is registered at own M2M service server 210 or registered at another M2M service server. For example, first user terminal 100 wants to share predetermined control rights with third user terminal 300. In this case, first user terminal 100 transmits a requests message to M2M service server 210 for sharing predetermined control right of M2M devices with third user terminal 300. In response to such request, determination module 2121 may determine whether third user terminal 300 is registered at first M2M service sever 210. Since third user terminal 300 is registered at second M2M service server 410, determination module 212 may determine that third user terminal 300 is an unregistered user terminal 300.

Temporal registration module 2122 may generate a temporal registration request message when third user terminal 300 is an unregistered user terminal as the determination result. Temporal registration module 2122 may transmit the generated temporal registration request message to third user terminal 300 through a M2M service server of third user terminal 300, which is second M2M service server 410.

Virtual SCL creation module 2123 may create a virtual SCL for a user terminal when first user terminal 100 requests first M2M service server 210 to share predetermined control rights of M2M devices with the user terminal. Virtual SCL creation module 2123 may assign the generated virtual SCL to the user terminal.

Fee calculation module 2124 may calculate a fee for all data exchanged between a user terminal and a M2M service platform in an IMS network and charge the user terminal based on the calculated fee. When providing a M2M service to an unregistered user terminal (e.g., third user terminal 300), fee calculation module 2124 may charge the original owner of a M2M device (e.g., first user terminal 100) for data exchanged between third user terminal 300 and first M2M service server 210. However, the present invention is not limited thereto. Such a target user terminal to charge may be determined based on a user selection of any of user terminals participating in sharing a control right of a M2M device.

Figure 7:
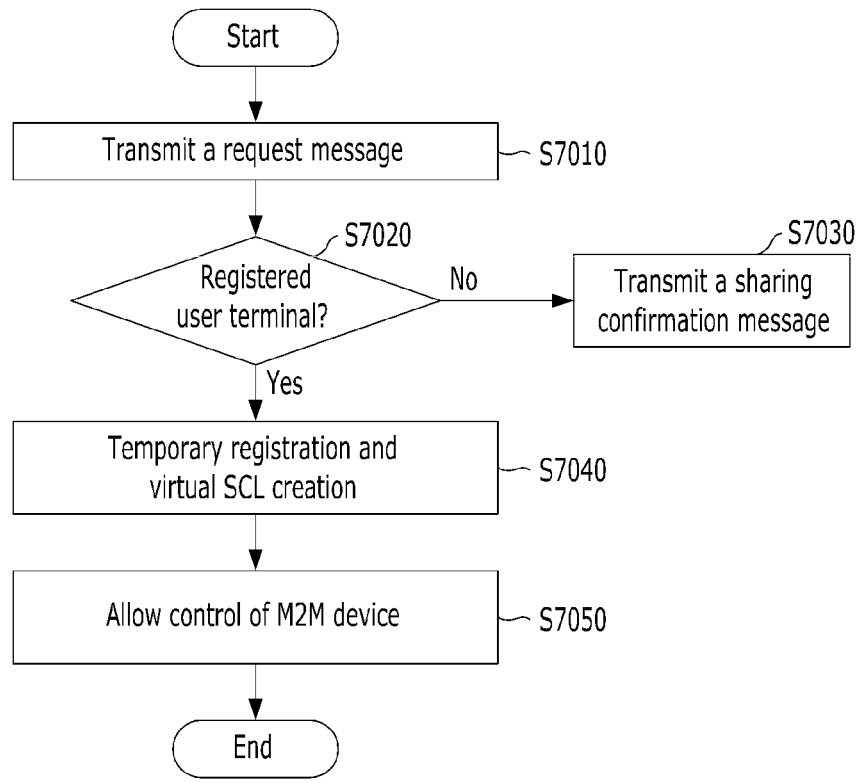
FIG. 7 illustrates a method of sharing a control right of a M2M device with user terminals in accordance with at least one embodiment.

FIG. 7 illustrates a method of sharing a control right of a M2M device with user terminals in accordance with at least one embodiment.

At step S7010, a request message for sharing predetermined control rights of M2M devices is transmitted to a M2M service server. For example, first user terminal 100 may select at least one control right of one of M2M device 501 to 503 to share with a target user terminal in response to a user input. First user terminal 100 may transmit a request message to first M2M service server 210 in order to share the selected control rights with the target user terminal. The request message may include information on the target user terminal, information on the selected control rights of M2M devices 501 to 503, and information on a sharing time period.

At step S7020, in response to the request message, first M2M service server 210 determines whether the target user terminal is a registered user terminal or an unregistered user terminal.

When the target user terminal is a registered user terminal at first M2M service server 210 (Yes-S7020), first M2M service server 210 may transmit a sharing confirmation message to the target user terminal. Such a sharing confirmation message may be transmitted based on a device ID of the target user terminal. The device ID of the target user terminal may be stored in first M2M service server 210 when the target user terminal is registered at M2M service server 210.

Then, first M2M service server 210 creates a virtual SCL for such a registered user terminal (e.g., the target user terminal) at step S7060. As described, such a virtual SCL may include information on an ID of the target user terminal, information on a M2M device to control, information on the designated control rights of the M2M device, and information on the sharing time period.

When third user terminal 300 is not registered as a subscriber of first M2M service server 210 (No-S7020), first M2M service server 210 temporary registers such an unregistered user terminal. For example, first M2M service server 210 may assign a temporal ID to the target user terminal.

At step 7050, first M2M service server 210 creates a virtual SCL for such an unregistered user terminal having a temporal ID at step S7060. As described, such a virtual SCL may include information on an ID of the target user terminal, information on a M2M device to control, information on the designated control rights of the M2M device, and information on the sharing time period.

At step S7060, first M2M service server 210 allows the target user terminal to control M2M devices 501 to 503 according to the generated virtual SCL.

Hereinafter, an operation for temporary registering an unregistered user terminal and creating a virtual SCL for an unregistered user terminal will be described with reference to FIG. 8.

Figure 8:
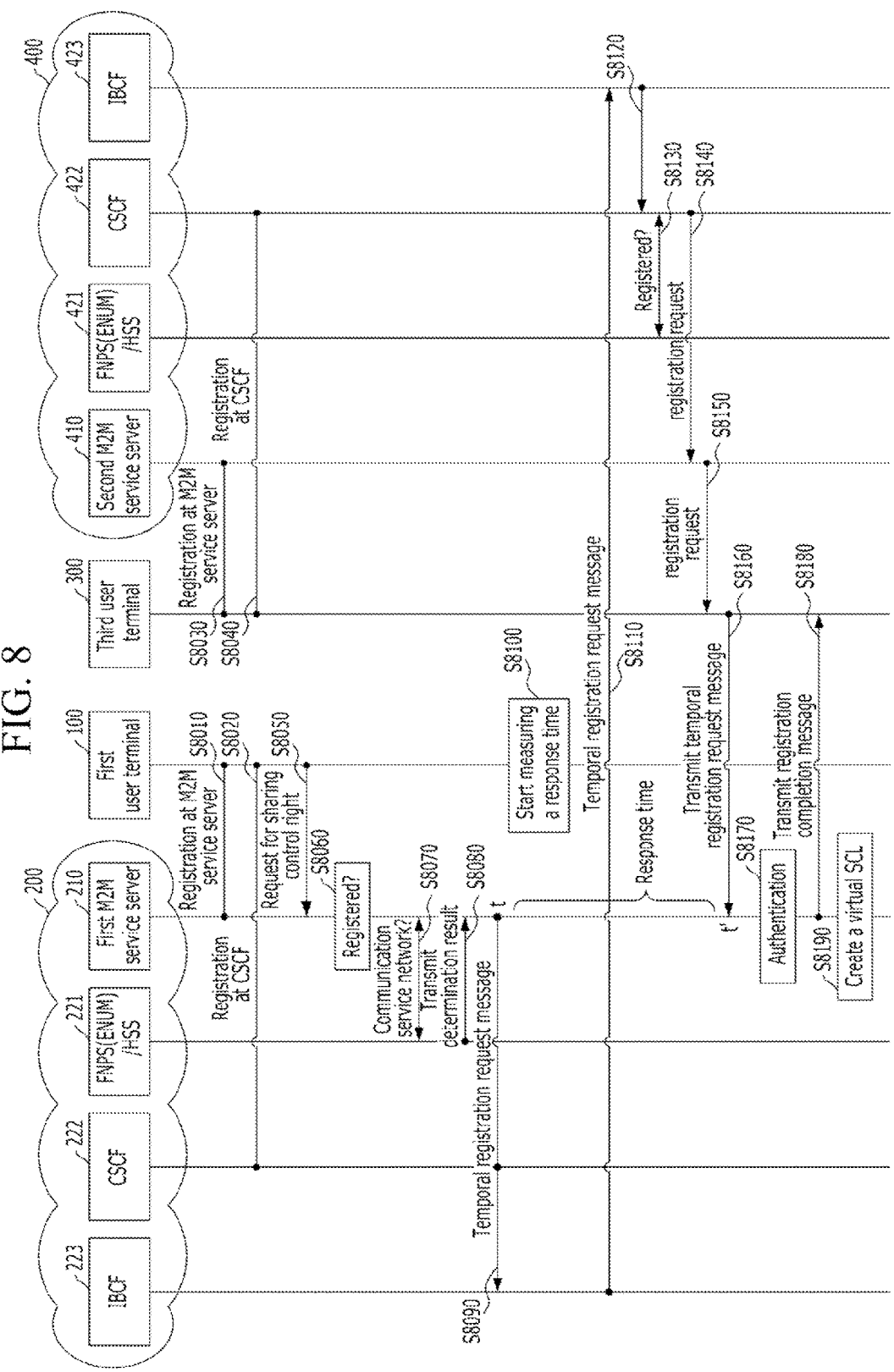
FIG. 8 illustrates temporal registration and creation of a virtual SCL for an unregistered user terminal in accordance with at least one embodiment.

FIG. 8 illustrates temporal registration and creation of a virtual SCL for an unregistered user terminal in accordance with at least one embodiment.

At step S8010, first user terminal 100 is registered at first M2M service server 210 in first communication service network 200 in order to use a M2M service provided by first M2M service server 210. At step S8020, first user terminal 100 is also registered at call session control function (CSCF) 222 for using a multimedia service provided by first IMS platform 220 in first communication service network 200. For example, first user terminal 100 includes a network application (NA) for using a M2M service provided by first M2M service server 210 and a SIP client for using a multimedia service provided by first IMS platform 220.

At step S8030, third user terminal 300 is registered at second M2M service server 410 in second communication service network 400 in order to use a M2M service provided by second M2M service server 410. At step S8040, third user terminal 300 is registered at CSCF 422 for using a multimedia service provided by second IMS platform 420 in second communication service network 400.

At step S8030, first user terminal 100 transmits a request message to first M2M service serve 210 in order to request first M2M service server 210 to share predetermined control rights of M2M devices 501 to 503 with third user terminal 300. In response to the request message, first M2M service server 210 transmits the request message to CSCF 222. The request message may include information on third user terminal 300 (e.g., telephone number of third user terminal 300), information on the target M2M device having control rights to share, types of control rights to share, and a sharing time period.

Although first M2M service server 210 was described as transmitting the request message directly to CSCF 222, the present invention is not limited thereto. For example, first M2M service server 210 may transmit the request message through MTC-interworking function (MTC-IWF). Such transmission method is introduced in Rel-11 SIMTC. Rel-11 SIMTC is standards for Machine type communications (MTC) introduced by 3rd generation partnership project (3GPP). Particularly, an SIP message may also be transmitted to CSCF 222 through MTC-interworking function (MTC-IWF) instead of directly transmitted from first M2M service server 210 to CSCF 222. In this example, the MTC-IWF is responsible for relaying a trigger request (e.g., request message) between a M2M service server (e.g., NSCL) located at an external network and network nodes. Such MTC-IWF also provides functions of authenticating a M2M service server, reporting a relay result, and identifying a M2M device/gateway triggered by an HSS function.

At step S8060, CSCF 222 determines whether first user terminal 100 is registered for a related service based on the information included in the request message. For example, CSCF 222 may obtain identification information (e.g., a mobile phone number) of first user terminal 100 included in the request message and determine whether first user terminal 100 is a subscriber of first IMS platform 220 based on the obtained identification information.

At step S8070, CSCF 222 may inquire of E.164 number mapping (ENUM) server/HSS 221 to determine a hosting communication service network of third user terminal 300 is registered as a subscriber. ENUM server 221 determines the communication service network of third user terminal 300 based on the identification information (e.g., telephone number) of third user terminal 300. ENUM server 222 may transmit a determination result message to CSCF 222. The determination result message may include information on a domain of third communication network 530. However, the present invention is not limited thereto. HSS 222 may be used to determine a hosting communication service network of third user terminal 300. At step S8080, CSCF 222 transmits the received determination result message to first M2M service server 210.

At step S8090, first M2M service server 210 generates and transmits a temporal registration request message to interconnection border control function (IBCF) 213. IBCF 213 is a network entity that provides control functions for establishing a link between first IMS platform 220 to second IMS platform 420. Although first M2M service server 210 was described as transmitting the temporal registration request message to IBCF 223, the present invention is not limited thereto. Such a temporal registration request message may be transmitted to other network entities that perform the same function of IBCF 223, depending on the specification of a network structure model or a mobile communication service network.

The temporal registration request message may be generated based on SIP for requesting registering of third user terminal 300 at first M2M service server 210. For example, the temporal registration message may be created in a form of: {Request(Registration), TempAppID(ID_C), SclBaseURI(NSCL_A), SecurityKey(K)}.

TempAppID is an ID of third user terminal 300 that is allocated to be able to identify third user terminal 300 in first M2M service server 210. Such ID is allocated because all user terminals registered at a M2M service server require a unique ID. SclBaseURI is an URI address of first M2M service server 210 in order to enable third user terminal 300 to transmit a temporal registration request message. SecurityKey is an encryption key to be used for authenticating third user terminal 300. Such an encryption key may be compared with a corresponding key upon the receipt of the temporary registration request for registering third user terminal 300 at first M2M service server 210.

At step S8100, first M2M service server 210 may start measuring a response time for temporal registration of third user terminal 300. For example, first M2M service server 210 records "third user terminal 300 is waiting for temporal registration" with an ID (e.g., ID_C) of third user terminal 300 and an encryption key (SecurityKey) and records a time of transmitting the temporal registration request message as a request time t.

At step S8110, IBCF 213 transmits the temporal registration request message received from first M2M service server 210 to IBCF 423 of second communication service network 400 where third user terminal 300 is originally registered form a related service.

At steps S8120 and S8130, IBCF 423 requests CSCF 442 and ENUM/HSS 441 of second communication service network 400 to confirm whether third user terminal 300 is registered with second communication service network 400.

At step S8140, CSCF 442 transmits a corresponding temporal registration request message to third M2M service server 410. At step S8150, third M2M service platform 410 transmits the received temporal registration request message to third user terminal 300. At step S8160, third user terminal 300 transmits the temporal registration request message to first M2M service server 210.

Upon the receipt of the temporal registration request message from third user terminal 300, first M2M service server 210 calculates the response time based on a time t' of receiving the temporal registration request message from third user terminal 300. For example, the total response time is a time period from the transmission time t and the reception time t'.

At step S8170, first M2M service server 210 compares the calculated response time (t'−t) with a maximum response time (Tms) and compares the encryption key included in the received temporal registration request message with an encryption key stored when first M2M service server 210 transmitted the temporal registration request message.

When the response time is less than the maximum response time and the transmitted encryption key is matched with the received encryption key, first M2M service server 210 temporary registers a network application (NA) with the ID of third user terminal 300. That is, first M2M service server 210 authenticates third user terminal 300 through comparing the encryption keys, creates a virtual SCL resource having information on shared control rights permitted by first user terminal 100, and modifies the virtual SCL resource to allow third user terminal 300 to access and use of the created virtual SCL. Such modification of the resource will be described with reference to FIG. 9.

At step S1880, first M2M service server 210 transmits a temporal registration completion message to third user terminal 300. Upon the receipt of the temporal registration completion message, third user terminal 300 may start control at least one of M2M devices 501 to 503 based on the shared control rights recorded in the virtual SCL. At step S1890, first M2M service server 210 creates a virtual SCL for third user terminal 300 based on information included in the request message for sharing a control right.

When first user terminal 100 requests first M2M service server 210 to share control rights of a M2M device with a user terminal registered at the same service platform (e.g., first M2M service server 210), first M2M service server 210 creates a virtual SCL for the user terminal without perform the temporal registration procedure.

Figure 9:
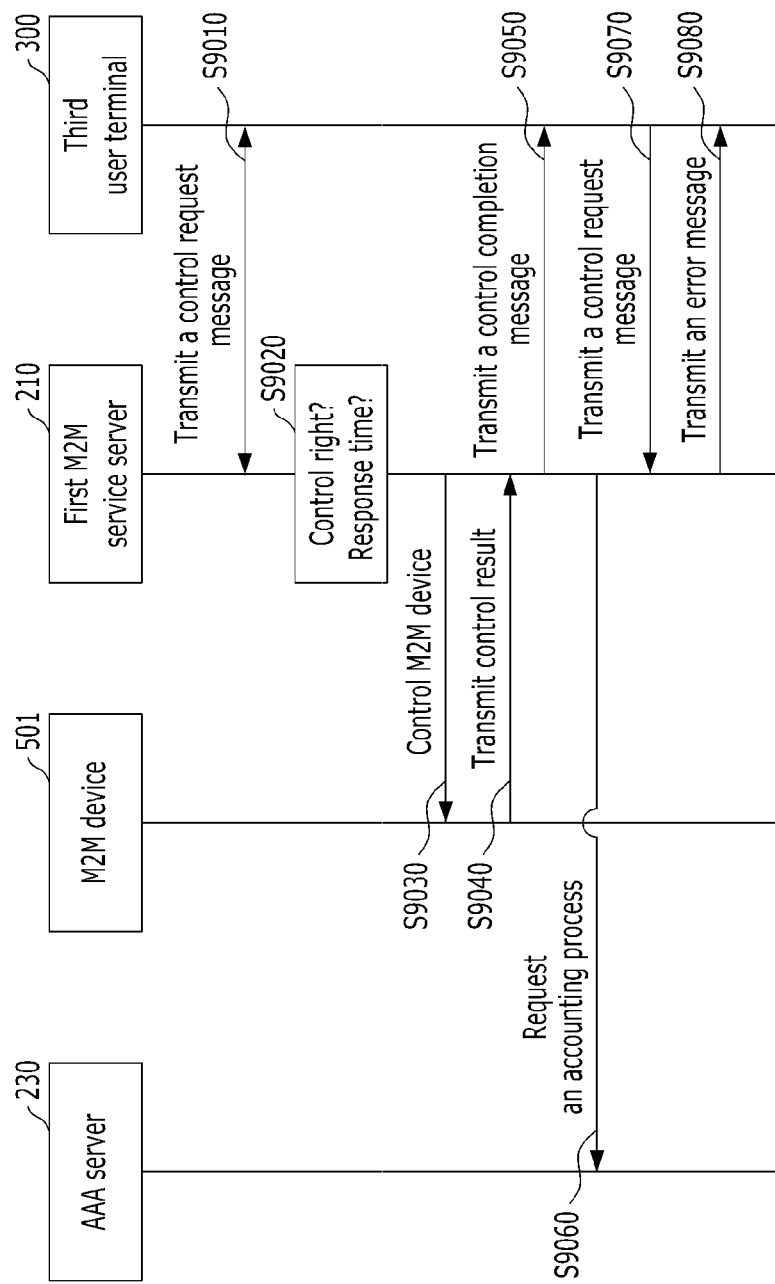
FIG. 9 illustrates controlling a M2M device by a temporary registered user terminal having a shared control right in accordance with at least one embodiment.

FIG. 9 illustrates controlling a M2M device by a temporary registered user terminal having a shared control right in accordance with at least one embodiment.

Referring to FIG. 9, third user terminal 300 transmits a control request message to first M2M service serve 210 in order to control M2M device 501 at step S9010. The control request message may include identification information of third user terminal 300, information on target M2M devices to control, information on original owner (e.g., first user terminal 100) of target M2M devices, information on an operation for controlling the target M2M device, and identification information on an associated virtual SCL.

At step S9020, M2M service server 210 may determine whether third user terminal 300 has predetermined control rights of the target M2M device (e.g., M2M device 501) based on the information included in the control request message. For example, M2M service server 210 may analyze the virtual SCL associated with third user terminal 300 to determine whether third user terminal 300 has control rights of M2M device 501. In addition, M2M service server 210 may determine whether third user terminal 300 requests the control of M2M device 501 within an associated sharing time period (e.g., expiration time) based on the virtual SCL.

At step 9030, M2M service server 210 may transmit the received control request message to M2M device 501 when third user terminal 300 has the predetermined control rights of M2M device 501 and the control request message is received within the sharing time period.

At step S9040, M2M device 501 receives the control request message, performs operations based on the information included in the control request message, and transmits a control result message to first M2M service server 210.

At step S9050, first M2M service server 210 receives the control result message from M2M device 501, may update the associated virtual SCL of third user terminal 300, and transmits an operation completion message to third user terminal 300. For example, information included in the control result message may be stored in a <container> resource stored in first M2M service server 210. The operation completion message may be transmitted to a URI address of third user terminal 300. Third user terminal 300 receives the operation completion message.

At step S9060, first M2M service server 210 calculates a packet size of data transmitted to third user terminal 300 upon the completion of transmitting all of data to third user terminal 300. First M2M service server 210 charges first user terminal 100 based on the calculated packet size, transmits the charging information to AAA server 230 of first communication service network 100, and requests AAA server 230 to perform an accounting process based on the charging information.

Furthermore, third user terminal may transmit a control request message for controlling a M2M device without a corresponding control right thereof or after an associated sharing time period at step S9070. In this case, first service server 210 determines whether third user terminal 300 has a control right or such a control request message is received within an associated sharing time period based on information included in the control request message.

In this case, since third user terminal 300 does not have a corresponding control right or since the control request message is received after the associated sharing time period, first M2M service server 100 may disallow third user terminal 300 to control the target M2M device and may transmit an error message to third user terminal 300 at step S9080. In addition, first M2M service server 100 may delete the virtual SCL of third user terminal 300 when the sharing time period is expired.

Figure 10:
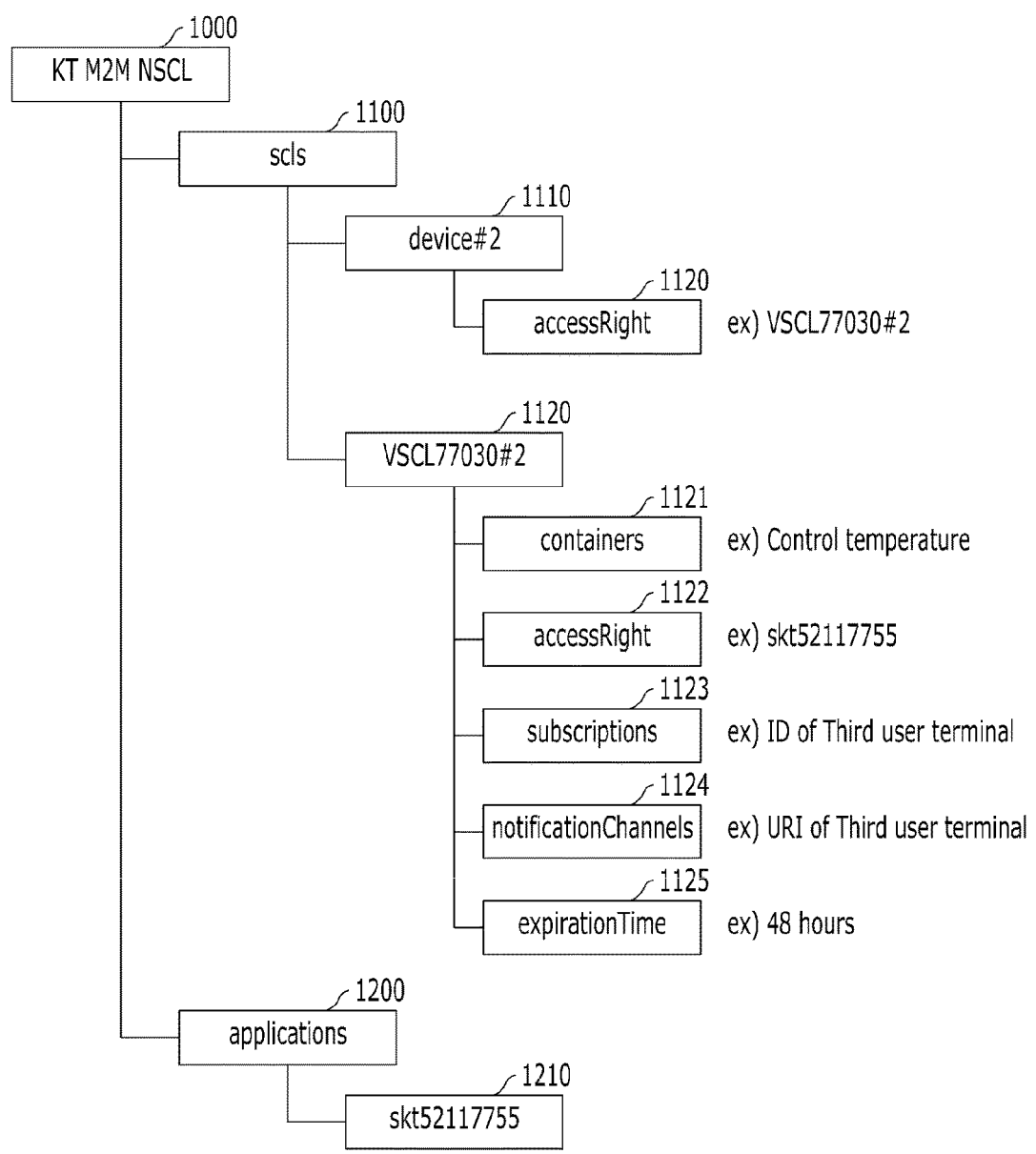
FIG. 10 illustrates a SCL resource and an application resource in accordance with at least one embodiment.

FIG. 10 illustrates a SCL resource and an application resource in accordance with at least one embodiment.

Particularly, FIG. 10 shows a virtual SCL created when a first user terminal (e.g., KT3337575) allows a second user terminal (e.g., skt52117755) to control predetermined features of a CCTV (Device#2). That is, when the first user terminal is registered for a M2M service to control the CCTV (Device#2) at Korea Telecom (KT)'s M2M service platform, <sclBase> resource 1000 may be created. In FIG. 10, such <sclBase> resource 1000 is named as "KT M2M NSCL".

<sclBase> resource 1000 includes <scls> resource 1100 and <applications> resource 1200. <scls> resource 1100 may contain information on a target M2M device to control and information on a virtual SCL created for the second user terminal. For example, <scl> resource 1110 may contain identification information of the CCTV (e.g., device#2) and another <scl> resource 1120 may contain identification information of the virtual SCL (VSCL77030#2) of the second user terminal. <applications> resource 1200 may contain information on user terminals having a control right of predetermined M2M devices. As shown, <application> resources 1210 and 1220 may contain identification information of the first user terminal (e.g., skt52117755) and the second user terminal (e.g., KT3337575).

In order to allow the second user terminal (e.g., skt52117755) to control predetermined features of the CCTV, <container> resource 1121 of the virtual SCL may contain target features to control (e.g., 1) zoom control, 2) angle control, and 3) power control) of the CCTV and <accessRight> resource 1122 may contain identification information (e.g., skt52117755) of the second user terminal as shown in FIG. 10.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of allowing user terminals to share a control right of a machine to a machine (M2M) device by a M2M service server, the method comprising:
   receiving a sharing request message from a first user terminal registered at the M2M service server to share predetermined control rights of a M2M device with a second user terminal;
   determining whether the second user terminal is a subscriber to the M2M service server in response to the sharing request message;

receiving a control request message from the second user terminal;

creating a virtual resource for the second user terminal based on information included in the sharing request message when the second user terminal is not a subscriber, wherein the virtual resource is at least one of a virtual service capability layer (SCL) and a virtual common service entity (CSE), and wherein the virtual resource includes information on the second user terminal, information on controllable features of the M2M devices each matched with predetermined control rights, respectively, information on a uniform resource identifier (URI) of the second user terminal, and information on a sharing time period;

determining target features of a M2M device to control based on information in the control request message; and allowing the second user terminal to control predetermined features of the M2M device based on the created virtual resource in response information in the control request message.

2. The method of claim 1, wherein the sharing request message includes information on the second user terminal, information on the M2M device to control, information on the predetermined control rights of the M2M device, and information on a sharing time period.

3. The method of claim 1, comprising:
temporary registering the second user terminal to the first M2M service server.

4. The method of claim 3, wherein:
the temporary registering includes transmitting a temporal registration request message to the second user terminal through a first communication service platform of the first user terminal and a second communication service platform of the second user terminal; and
performing the temporary registering upon receipt of a registration request message from the second user terminal.

5. The method of claim 4, wherein:
the temporal registration message is a session initiation protocol (SIP) message that includes at least one of information on an address of the second communication service platform, a temporary ID of the second user terminal, and an encryption key for sharing the control right.

6. The method of claim 4, wherein the transmitting a temporal registration request message includes:
determining domain information on a second communication network of the second user terminal from an ENUM server; and
transmitting the temporal registration request message to the second user terminal using the determined domain information of the second communication network.

7. The method of claim 3, wherein the temporary registering the second user terminal includes:
generating an encryption key for sharing the control right with the second user terminal;
creating a temporal registration request message including the generated encryption key;
transmitting the temporal registration request message to the second user terminal; and
performing an authentication process upon receipt of a registration request message from the second user terminal.

8. The method of claim 7, wherein the performing an authentication process includes:
comparing the generated encryption key with an encryption key included in the registration request message from the second user terminal.

9. The method of claim 1, wherein the allowing the second user terminal to control predetermined features of the M2M device includes:
determining whether the second user terminal has control rights matched with the target features of the M2M device based on the virtual resource associated with the second user terminal; and
allowing the second user terminal to control the target features of the M2M device when the second user terminal has the control rights matched with the target features of the M2M device based on the associated virtual resource.

10. The method of claim 9, further comprising:
determining whether the control request message is received before a sharing period time associated with the second user terminal expires.

11. The method of claim 1, comprising:
charging the first user terminal for data exchanged with the second user terminal and the M2M device.

* * * * *